United States Patent
Finlayson et al.

(10) Patent No.: US 10,269,102 B2
(45) Date of Patent: Apr. 23, 2019

(54) IMAGE PROCESSING METHOD AND SYSTEM

(71) Applicant: SPECTRAL EDGE LIMITED, Norwich (GB)

(72) Inventors: Graham Finlayson, Norwich (GB); Roberto Montagna, Norwich (GB)

(73) Assignee: SPECTRAL EDGE LIMITED, Norwich (GB)

( * ) Notice: Subject to any disclaimer, the term of this patent is extended or adjusted under 35 U.S.C. 154(b) by 0 days.

(21) Appl. No.: 14/903,360

(22) PCT Filed: Jul. 8, 2014

(86) PCT No.: PCT/GB2014/052070
§ 371 (c)(1),
(2) Date: Jan. 7, 2016

(87) PCT Pub. No.: WO2015/004437
PCT Pub. Date: Jan. 15, 2015

(65) Prior Publication Data
US 2016/0148354 A1    May 26, 2016

(30) Foreign Application Priority Data

Jul. 8, 2013  (GB) .................................. 1312196.7
Jul. 9, 2013  (GB) .................................. 1312310.4
Jan. 30, 2014 (GB) .................................. 1401599.4

(51) Int. Cl.
*G06K 9/00* (2006.01)
*G06T 5/00* (2006.01)
(Continued)

(52) U.S. Cl.
CPC ............... *G06T 5/007* (2013.01); *G06T 7/11* (2017.01); *G06T 7/90* (2017.01); *G06T 11/001* (2013.01); *G06T 2207/10024* (2013.01)

(58) Field of Classification Search
CPC ....... G06T 5/007; G06T 7/0081; G06T 7/408; G06T 11/001; G06T 2207/10024;
(Continued)

(56) References Cited

U.S. PATENT DOCUMENTS 6,931,151 B2 * 8/2005 Weast ................. G06T 11/001
345/589
6,985,524 B1  1/2006 Borchers
(Continued)

FOREIGN PATENT DOCUMENTS

EP       1453006 A1   9/2004
EP       1530379 A3   7/2006
WO    WO 94/11987     5/1994

OTHER PUBLICATIONS

Jia-Bin Huang et al, "Information Preserving Color Transformation for Protanopia and Deuteranopia", IEEE Signal Processing Letters, vol. 14, No. 10, pp. 711-714. Oct. 2007.
(Continued)

*Primary Examiner* — Jose L Couso
(74) *Attorney, Agent, or Firm* — Leason Ellis LLP

(57) ABSTRACT

An image processing method, system and device are disclosed. In the method, sensor responses for an input image are estimated, the sensor responses including sensor responses for cone sensors including a first cone sensor set and a second, different, cone sensor set. In dependence on the sensor responses, a transform mapping for application to a source image is determined to generate a modified image.

19 Claims, 8 Drawing Sheets

(51) Int. Cl.
*G06T 11/00* (2006.01)
*G06T 7/11* (2017.01)
*G06T 7/90* (2017.01)

(58) Field of Classification Search
CPC ............ G06T 2207/10152; G09B 7/00; G09B 21/001; G09B 21/008; H04N 1/60; H04N 1/6088; H04N 9/3182; H04N 9/64; H04N 13/0422; H04N 17/02; H04N 17/04; H04N 21/4584; H04N 2005/44517; G02B 27/0101; G02B 2027/0112; G02B 2027/014; G09G 3/003; G09G 5/02; G09G 2320/0242; G09G 2320/0666; G09G 2340/06; G09G 2340/14; G06F 3/04897; G06F 17/30905
See application file for complete search history.

(56) References Cited

U.S. PATENT DOCUMENTS

| | | | | |
|---|---|---|---|---|
| 7,873,213 | B2* | 1/2011 | Speigle | H04N 1/60 |
| | | | | 382/167 |
| 9,836,828 | B2* | 12/2017 | Jones | G06T 5/006 |
| 9,888,153 | B2* | 2/2018 | Kurtz | H04N 1/6033 |
| 2001/0053246 | A1* | 12/2001 | Tachibana | G06T 11/001 |
| | | | | 382/162 |
| 2004/0042653 | A1* | 3/2004 | Hu | G06T 5/007 |
| | | | | 382/167 |
| 2012/0147163 | A1* | 6/2012 | Kaminsky | G09G 5/028 |
| | | | | 348/62 |
| 2014/0015850 | A1* | 1/2014 | Ahn | H04N 1/60 |
| | | | | 345/594 |
| 2014/0066196 | A1* | 3/2014 | Crenshaw | A63F 13/10 |
| | | | | 463/31 |
| 2016/0071470 | A1* | 3/2016 | Kim | G09G 3/3607 |
| | | | | 345/690 |
| 2016/0148354 | A1* | 5/2016 | Finlayson | G06T 5/007 |
| | | | | 382/164 |
| 2016/0155344 | A1* | 6/2016 | Mihai | G09B 5/02 |
| | | | | 434/365 |
| 2017/0065168 | A1* | 3/2017 | Bex | A61B 3/08 |
| 2017/0079524 | A1* | 3/2017 | Bex | A61B 3/08 |
| 2017/0116885 | A1* | 4/2017 | Wilczek | G09B 19/0023 |
| 2017/0193925 | A1* | 7/2017 | Park | G09G 3/3406 |
| 2017/0301310 | A1* | 10/2017 | Bonnier | G09G 5/04 |

OTHER PUBLICATIONS

Kotera et al, "Optimal Daltonization by Spectral Shift for Dichromatic Vision". Twentieth Color and Imaging Conference. pp. 302-308. Jan. 1, 2012.

Jae-Yun Jeong et al, "An efficient re-coloring method with information preserving for the color-blind",IEEE Transactions on Consumer Electronics vol. 57. No. 4, Nov. 2011.

Seungji Yang et al: "Visual contents adaptation for color vision deficiency". Proceedings 2003 International Conference on Image Processing, vol. 1.; p. 453-456 Sep. 2003.

Gabor Kovacs et al, "Enhancing color representation for anomalous trichromats on CRT monitors," Color Research & Application, pp. 5273-5276. Jan. 1, 2001.

* cited by examiner

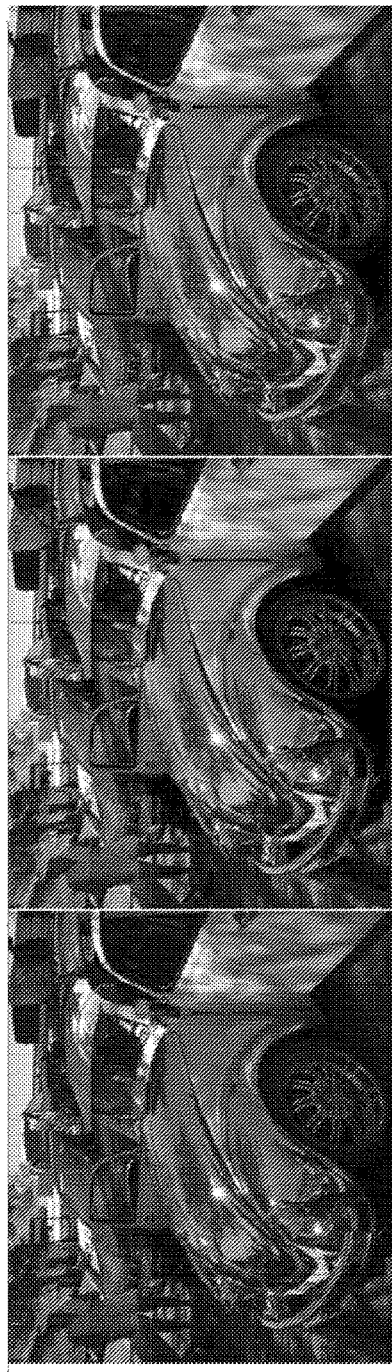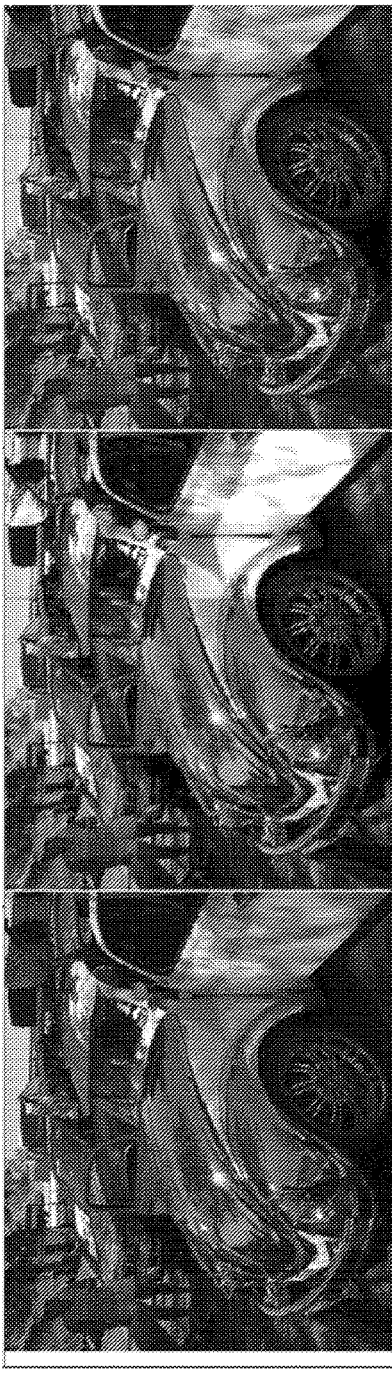

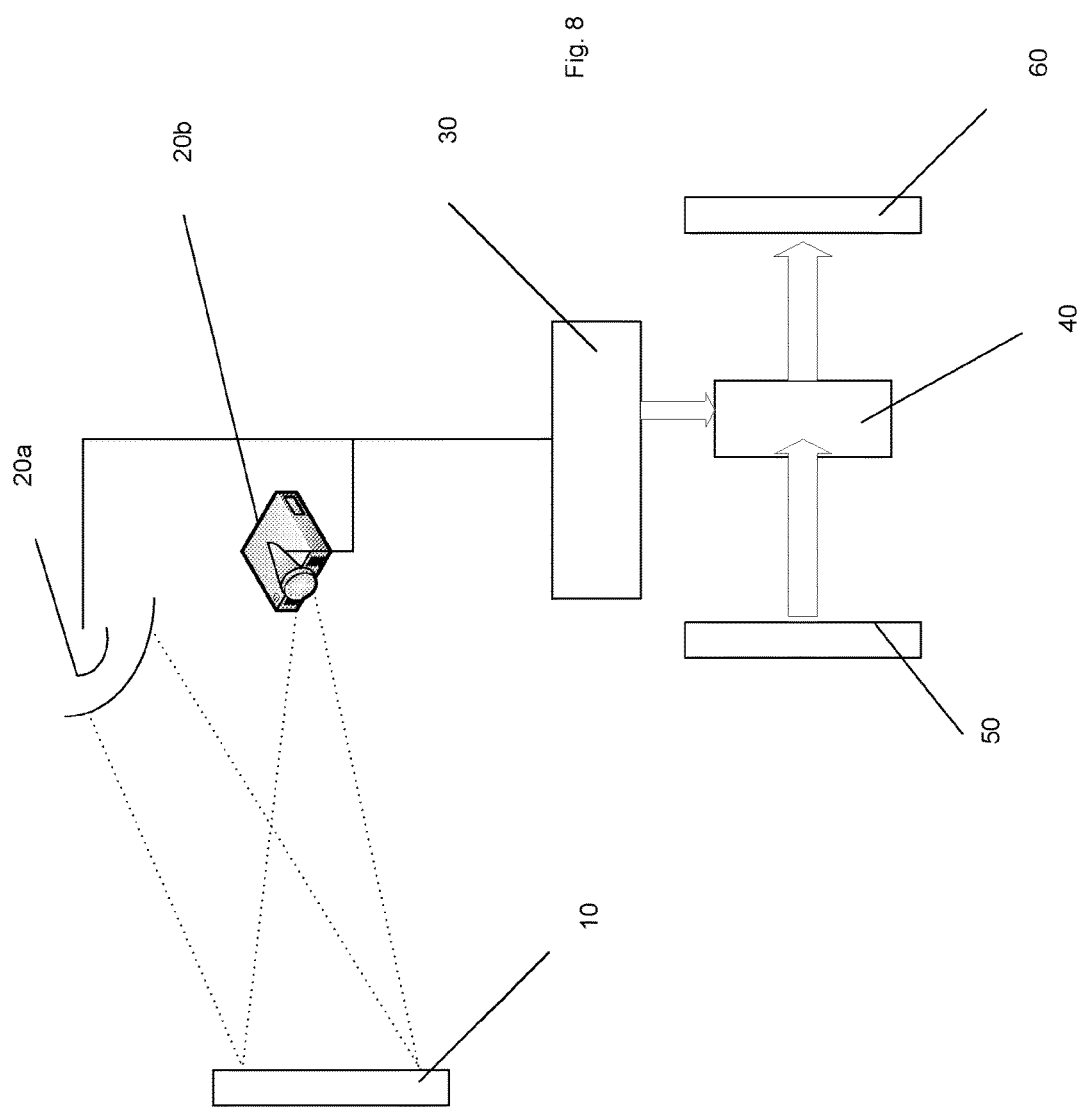

IMAGE PROCESSING METHOD AND SYSTEM

CROSS-REFERENCE TO RELATED APPLICATIONS

This application is a U.S. National Stage Application under 35 U.S.C. § 371 of International Patent Application No. PCT/GB2014/052070, filed Jul. 8, 2014 which claims priority to Great Britain Patent Application No. 1401599.4, filed Jan. 30, 2014, Great Britain Patent Application No. 1312310.4, filed Jul. 9, 2013 and Great Britain Patent Application No. 1312196.7, filed Jul. 8, 2013, the contents of which are hereby incorporated by reference in their respective entireties.

FIELD OF THE INVENTION

The present invention relates to imaging processing methods and systems and also to products such as filters designed or produced to leverage results of the imaging processing methods and systems.

BACKGROUND TO THE INVENTION

The human visual system has 3 types of sensors: Long-, Medium- and Short-wave sensitive cone mechanisms (referred to as L, M and S, respectively). The interaction of a spectral power distribution (a light) with these sensors:

$$P_k = \int_\omega C(\lambda) Q_k(\lambda) d\lambda \quad (1)$$

In (1), $C(\lambda)$ denotes the spectral power distribution entering the eye, and $Q_k(\lambda)$ for $k \in \{L, M, S\}$ denotes the cone responses. The integration is over the visible spectrum co (approximately 400 to 700 Nanometers). Note here and throughout the document we adopt the convention that cone responses are vectors denoted by an uppercase P. Given (1) we can, as we show later, find the red, green and blue pixel values in an image that produce a desired colour, to match the colours in the image captured by a digital camera.

In fact, from a colour reproduction perspective, (1) is simplistic in the sense that each of us has unique cone sensitivities. The best colour fidelity would result in a different monitor image for each of us. Of course this is impossible: a colour monitor can produce one image. This image is usually matched to an average observer.

STATEMENT OF INVENTION

According to an aspect of the present invention, there is provided an image processing method comprising:
estimating sensor responses for an input image, the sensor responses including sensor responses for cone sensors including a first cone sensor set and a second, different, cone sensor set; and, determining, in dependence on the sensor responses, a transform mapping for application to a source image to generate a modified image.

In aspects of present invention we seek to set forth methods for producing an image which makes information that is difficult to see for colour-blind observers more accessible, while simultaneously retaining good fidelity for colour-normal and colour-blind observers alike. The images we produce are more natural (pleasing and closer to the original) than the prior art. Embodiments of the present invention are also applicable in other areas, such as improving image fidelity to suit a range of viewers, some of whom may have differing degrees of colour-blindness.

In embodiments of the present invention, a transform is calculated from an input image that can then be applied to a source image to generate a modified image. The source image might be the same as the input image. Generally, however, the input image and source image will be different images, the input image serving to enable the sensor responses to be obtained for the differing cone sensors (the input image typically acting as a known factor from which common measurements can be taken for the cone sensors). The transform mapping can then be applied to a source image (such as a TV or monitor signal to be displayed, an image to be printed etc.) such that the modified image is more suitable to the particular viewer. In some embodiments, the modified image may not be "more" suitable and in fact may be modified to highlight what another viewer can and cannot see in the image.

Preferably, the modified image has optimized colour fidelity for one or more of the cone sensors. Preferably, the modified image, when viewed by one of the cone sensor sets, reflects how the source image is seen when viewed by another of the cone sensor sets.

The cone sensors may include a normal cone sensor set and an anomalous cone sensor set.

The step of determining may include determining a transform mapping arranged to generate a modified image that is optimised to induce similar normal cone sensor and anomalous cone sensor responses when viewed. The step of estimating may include relating known cone responses for a known colour reference to those measured by an imaging device.

The source image may be the input image. The source image may be different to the input image. The source image may be a daltonized image. The method may include the step of determining a rotation matrix R that when applied to the daltonized source image takes the daltonized source image in anomalous coordinate space substantially back to the input image. The method may include the step of mapping anomalous responses in the daltonized source image back to their original counterparts using a mapping that includes a penalty term, the penalty term at least approximately preserving Euclidean distance.

The step of determining may include determining a transform that optimizes the source image whereby the cone responses of at least one of the cone sensor sets in response to viewing the modified image are similar to the cone response of another of the cone sensor sets in response to viewing of the source image.

The step of determining may include determining a transform that optimizes the source image by minimizing a difference in the cone responses of one of the cone sensor sets in response to viewing the source and modified images.

The step of determining may include determining a transform that minimizes a calculated difference in cone response to the modified image by the first and second cone sensor sets, the first cone sensor set being a normal cone sensor set and the second cone sensor set being an anomalous cone sensor set.

The step of determining may include applying a weighting factor to bias the minimization.

The step of determining may be based on a normal cone set and a first and second related anomalous cone sensor set wherein the transform optimised for the first anomalous set minimizes a calculated difference in cone response to the modified image for the second cone sensor set.

The method may further comprise encoding the transform mapping in a computer program executable to transform a source image to generate the modified image. The computer program may comprise a display driver for applying the transform mapping to input data and providing the modified image for display on a display.

The method may further comprise including the transform mapping in a device to modify a received source image to generate the modified image as an output of the device.

The device may be selected from a set including a printer, a television, a computing device, a smartphone, a digital camera or a transmissive filter.

According to an aspect of the present invention, there is provided a device including a transform mapping obtainable by the method of any of the recited method claims.

The device may be selected from a set including a printer, a television, a computing device, a smartphone, a digital camera or a transmissive filter.

Preferably, the modified image is optimised to induce similar normal cone and anomalous cone responses in the output. Preferably, the modified image is optimised such that the output cone responses are similar to the input.

Optimisation may be minimising a calculated difference in cone response to the modified image by the sensor and anomalous sensor.

Optimisation can incorporate the notions of the degree-of-severity of colour blindness and the idea that an image optimised for one degree of severity may be viewed by an observer who suffers a yet greater degree of colour blindness.

Deriving the modified image may comprise determining a transform mapping for application to a source image to generate a modified image.

The input image may be a daltonized (an image that has undergone daltonization) or other pre-processed image. The form of the mapping might be constrained. For example from the input image we could calculate a daltonized counterpart. We then solve for a rotation taking daltonized responses back to input image. In so doing we preserve the magnitudes of differences between the colours in the daltonized image. But, achieve better fidelity by rotating daltonized colours so they are closer to the original input.

According to another aspect of the present invention, there is provided a transmissive filter configured to modify properties of light passing through the filter to induce an optimised sensor response (such as improved colour fidelity) by one or more cone sensor types.

In embodiments of the present invention disclosed below, the notion that making an image in this average way is the best thing to do is challenged. Aspects of the present invention seek to provide methods and systems for new ways of making an image that will produce better colour fidelity for all observers.

While the methods discussed below are applicable to the range of cone response functions found in colour-normal observers, the methods have been found to be particularly powerful when applied to colour-deficient observers. Around 10% of men and 1% of women suffer from some kind of colour blindness. The vast majority of colour deficient observers are red-green colour-blind. That is to say they have reduced medium-wave sensitivity (deuteranopes) or reduced long-wave sensitivity (protanopes). These two classes account for over 90% of colour-blind people. In one embodiment, a conventional input image is mapped to a new reproduction such that the image offers improved fidelity. By improved we preferably mean that the normal observer sees little change from the original but the colour-blind observer sees (perceives) an image that 'looks' better. A key component of 'looks' is that the colour-blind observer will see detail they could not see before, often allowing them to pass conventional colour blindness tests (at least some of the time).

Aspects of the present invention seek to provide a method to produce images to improve colour-blind visual experience while simultaneously maintaining good colour fidelity for colour-normal observers. The antecedent work in this (e.g., [2]) focuses on bringing out detail for colour blindness independently of any consideration of how the processed image looks to a colour-normal.

The simplest embodiments have 'closed form' solutions: we can characterise the required correction precisely. In the case of embodiments utilising second-order optimizations (which incorporate ideas such as colour difference), these cannot be solved in closed form. However, in these cases a search strategy such as [3], which is incorporated herein in its entirety by reference, suffices.

BRIEF DESCRIPTION OF THE DRAWINGS

Embodiments of the present invention will now be described, by way of example only, with reference to the accompanying drawings in which:

FIGS. 7A-7C illustrate the processing of an image using methods according to embodiments of the present invention;

FIGS. 7D-7F are black and white version of FIGS. 7A-7C deliberately manipulated to highlight colour differences when printed or displayed in black and white; and, FIG. 8 is a schematic diagram of a system according to an embodiment of the present invention.

DETAILED DESCRIPTION

Figure 1:
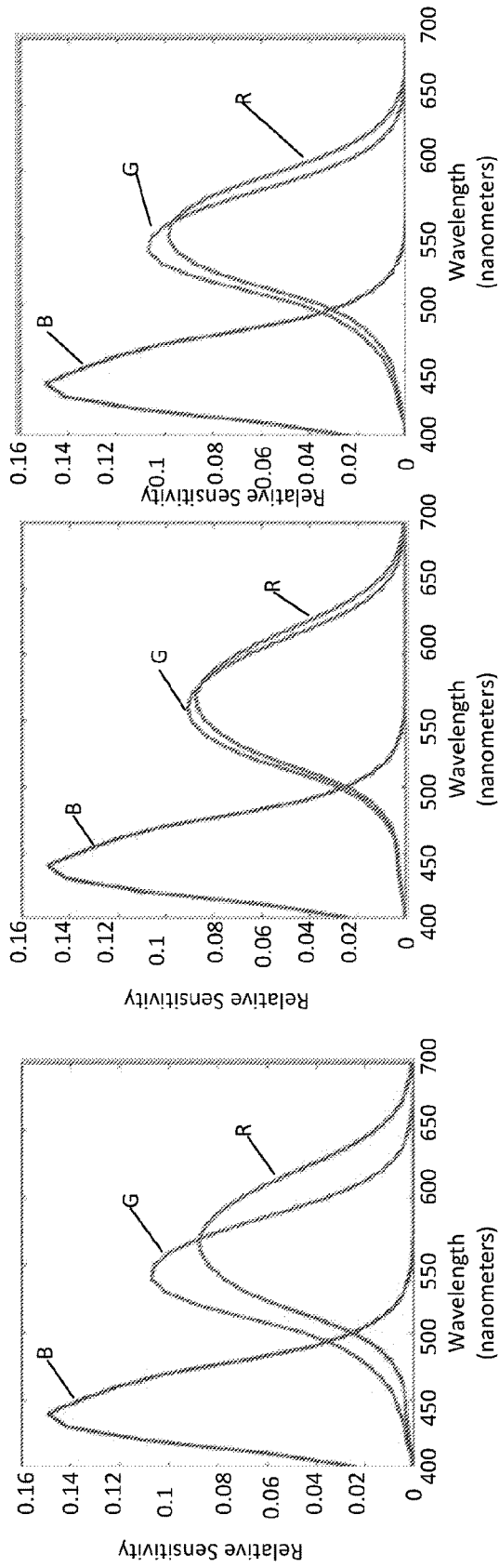
FIG. 1 is a series of graphs showing Cone (left graph), anomalous deuteranope (middle graph) and anomalous protanope (right graph) sensitivities.

Most colour-blind observers are so-called colour anomalous. An anomalous deuteranope is missing the medium-wave sensitive mechanism but has a second long-wave sensor which is positioned a little towards the medium-wave portion of the spectrum. An anomalous protanope is missing the long-wave sensitive mechanism but has a second medium-wave sensor which is positioned a little towards the long-wave portion of the spectrum. Cone, anomalous deuteranope and anomalous protanope sensitivities are shown, respectively, in the left, middle and right graphs of FIG. 1. Mathematically, the response for anomalous observers is written as:

$$p_k = \int_\omega C(\lambda) q_k(\lambda) d\lambda \quad (2)$$

Where $q_k(\lambda)$ denotes the sensitivities of a red-green anomalous colour-blind observer. We adopt the convention to denote the responses of an anomalous observer by a lower-case p. Protanopes and deuteranopes have two cone responses in common with colour-normals:

Deuteranope  Protanope $$P_L = p_L \quad P_M = p_m$$

$$P_S = p_S \quad P_S = p_S \quad (3)$$

Colour confusion is clearly related only to the response in one colour channel. An anomalous deuteranope will confuse two colours—relative to a colour-normal—when:

$$P_M^1 \neq P_M^2 \, \& \, p_M^1 \approx p_M^2 \quad (4)$$

An anomalous protanope will be confused—relative to a colour-normal—when:

$$P_L^1 \neq P_L^2 \, \& \, p_L^1 \approx p_L^2 \quad (5)$$

In (4) and (5) superscripts denote different lights (i.e., from different pixels in an image).

Anomalous dichromats have a range of severity in their colour blindness. One way to model the severity in colour blindness would be to measure how similar the two long-wave sensor mechanisms are to one another. As the sensors converge (to being equal) then an anomalous dichromat, mathematically, becomes a 'pure' deuteranope (i.e., missing the medium-wave cone completely). Of course a pure dichromat has only two types of sensors but, to simplify the notation and to distinguish between the pure and anomalous, we think of both as having three sensors. For pure deuteranopes and protanopes respectively we assume that $q_M(\lambda) = Q_L(\lambda)$ and $q_L(\lambda) = Q_M(\lambda)$.

Colorimetry and Colour Blindness

Figure 2:
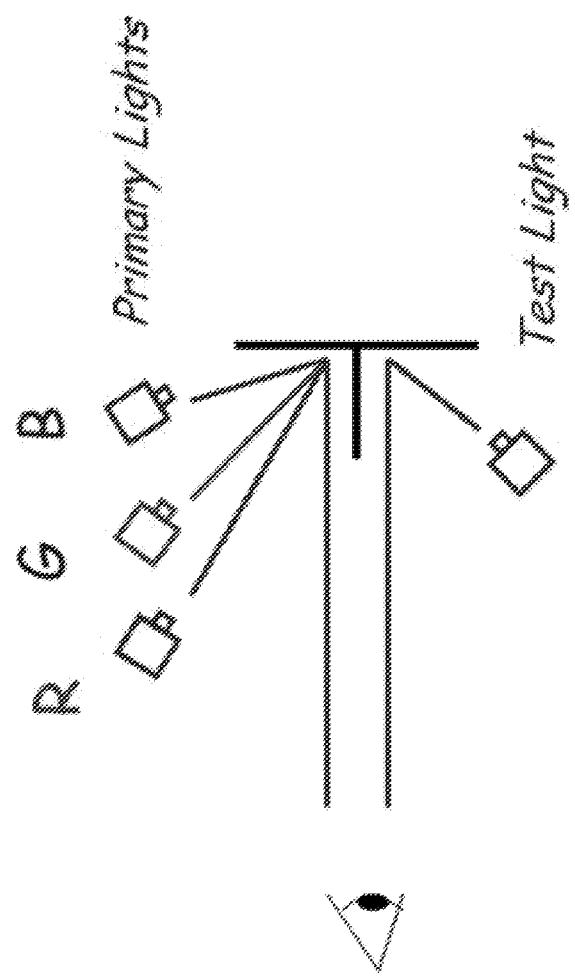
FIG. 2 is an illustration of a colour matching experiment.

Colorimetry is built on top of the colour matching experiment. Here an observer views a test light $T(\lambda)$ and simultaneously, in a different part of their visual field, a second light which is mixture of $\alpha R(\lambda)$, $\beta G(\lambda)$ and $\gamma B(\lambda)$ lights ($\alpha$, $\beta$ and $\gamma$ are scaling factors controlling the intensity of the lights). Because of our model of how the cones respond to light (equation (1)) for most test lights $T(\lambda)$ we can find a colour mixture of R, G and B that makes a match. The colour matching experiment is shown in FIG. 2. An observer (the illustrated eye) mixes different intensities of the three primary lights (in the illustrated example, red (R), green (G) and blue (B)) to match the colour of the test light.

To see how colour matching works let us begin by writing the colour mixture as a matrix equation (we can do this as sensor response (1)—i.e., integration—is a linear operator).

$$\underline{P} = \begin{bmatrix} P_L \\ P_M \\ P_S \end{bmatrix} = \quad (6)$$

$$\begin{bmatrix} \int_\omega R(\lambda)Q_L(\lambda)d\lambda & \int_\omega G(\lambda)Q_L(\lambda)d\lambda & \int_\omega B(\lambda)Q_L(\lambda)d\lambda \\ \int_\omega R(\lambda)Q_M(\lambda)d\lambda & \int_\omega G(\lambda)Q_M(\lambda)d\lambda & \int_\omega B(\lambda)Q_M(\lambda)d\lambda \\ \int_\omega R(\lambda)Q_S(\lambda)d\lambda & \int_\omega G(\lambda)Q_S(\lambda)d\lambda & \int_\omega B(\lambda)Q_S(\lambda)d\lambda \end{bmatrix} \begin{bmatrix} \alpha \\ \beta \\ \gamma \end{bmatrix} =$$

$$M\underline{\alpha}$$

Now, it is easy to find—solve for—the RGB (i.e., the $\alpha$, $\beta$ and $\gamma$ in the vector $\underline{\alpha}$) that match the response $\underline{P}^{Test}$ to the test light:

$$\underline{\alpha} = M^{-1}\underline{P}^{Test} \Rightarrow M\underline{\alpha} = \underline{P}^{Test} \quad (7)$$

Sometimes in solving (7) we may obtain negative numbers. This indicates that a 3 primary display device cannot reproduce the desired colour. Yet, since colour TV works so well (TVs and displays exploit the colour matching experiment), most colours can be reproduced.

Clearly a colour-blind observer will have a different 3×3 sensor transform—from RGBs to anomalous responses—which we denote $M^+$. The RGB that induces a match to the test light is defined as:

$$\underline{\alpha}^+ = [M^+]^{-1}\underline{P}^{Test} \quad (8)$$

We note that for pure colour-blind $M^+$ is a non-invertible matrix. This draws attention to the fact that there will be many mixtures of R, G and B that will match a test light for a pure colour-blind.

Calculating Sensor Transforms by Regression

Mathematically, if we know the effective spectral response of our camera, $R_k(\lambda)$, that drives the monitor then we can also solve for M by regression:

$$\underline{r}_i = \int_\omega C_i(\lambda)R_k(\lambda)d\lambda \quad (9)$$

$$\min_M \|M\underline{r}_i - \underline{P}_i\|$$

Here i indexes a set of calibration spectra (e.g., the signal reflected from a colour chart). In this framework the best mapping $N \approx M^{-1}$ taking cone responses back to RGBs (which is not a simple matrix inverse) is also solved for by regression:

$$\min_N \|(\underline{r}_i) - N\underline{P}_i\| \quad (10)$$

In the regression framework we need not restrict ourselves to 3×3 linear matrices. We might also solve for $$\min_{m()} \|m(\underline{r}_i) - \underline{P}_i\| \quad (11)$$

Where m( ) is some function (e.g., a polynomial regression). The inverse relation n( )—the mapping from cones to RGBs—is found analogously.

Visualising What a Colour-Blind Person Sees

The visualisation problem is generally addressed from a colour matching perspective. Equations (7) and (8) teach how to colour match for colour-normal and colour anomalous observers. It is proposed [1] that if we induce the same triplet of responses in a colour-normal as the triplet seen by an anomalous observer then we will effectively visualize what they see. Relative to the preceding discussion on colour matching then we need to drive the colour display with:

$$\underline{\alpha}' = M^{-1}[M^+]\underline{\alpha} \quad (12)$$

Figure 3A:
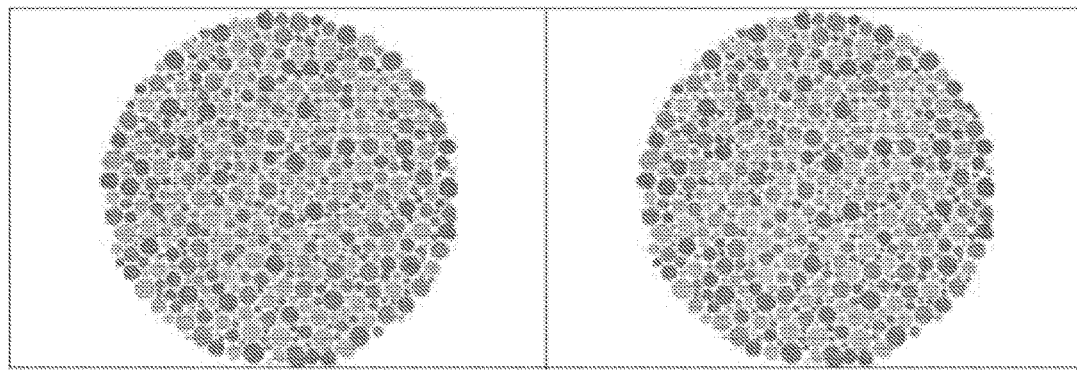
FIG. 3A illustrates an Ishihara plate (left image) and the visualisation generated by an embodiment of how it would be seen by a red-green colour blind person (right image)
Figure 3B:
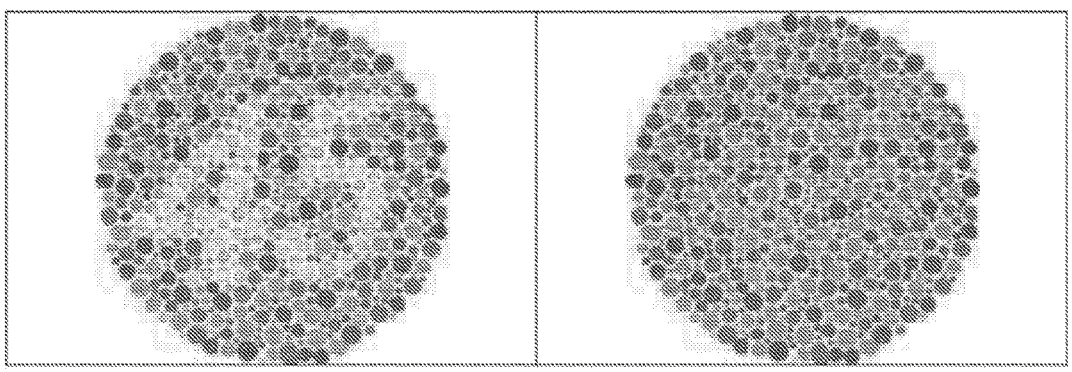
FIG. 3B is a black and white version of FIG. 3A deliberately manipulated to highlight colour differences when printed or displayed in black and white.

That is, we calculate the anomalous response of a given RGB (image pixel) and then solve for the RGB that for the cone sensors induces the same response (the inverse of the sensor transform for cone sensors). FIG. 3A illustrates an Isihara plate (left image) and visualisation generated by an embodiment of how it would be seen by a red-green colour blind person (right image). According to this visualisation the Ishihara plate is 'seen' by a pure deuteranope as the right hand image. Notice the number 45 disappearing. Reassuringly, deuteranopes cannot see this number and so the visualisation correctly predicts the colour-blind visual experience.

Visualising how colour-blind people might see has a number of useful applications. A designer may, for example, wish to use a visualisation tool to check that their packaging, fabric, sign, user interface or product design is visually accessible.

Daltonization

While visualising what a colour-blind person sees is useful, it is perhaps even more useful to modify an image so that a colour-blind observer can see something they could not see before. Felicitously, such modifications are called daltonization (John Dalton was an 18$^{th}$ century chemist who was among the first to describe colour blindness in scientific terms).

Example Calculation

Let us calculate the cone response and deuteranomalous response for a given RGB image I. Here we use the superscript to index the (i,j) pixel location:

$$\underline{p}^{i,j}=[M^+]^{-1}\underline{\alpha}^{i,j} \quad \underline{P}^{i,j}=[M]^{-1}\underline{\alpha}^{i,j} \tag{13}$$

We now calculate the difference image D:

$$D^{i,j}=P_L^{i,j}-P_M^{i,j} \tag{14}$$

For a deuteranomalous observer D constitutes the information they cannot see (since their medium- and long-wave sensor mechanisms are almost the same, the contrast between these channels is small or zero). Let us now make a modified image:

$$J^{i,j}=MP^{i,j} \quad P_S^{i,j}=P_S^{i,j}+kD^{i,j} \tag{15}$$

Where k is a user-defined scalar. We add the scaled contrast that is invisible to the deuteranope to the blue channel in the hope that this will make the invisible detail visible. In fact the difference image can be added in many ways to the cone image. Rather than adding simply to the blue channel we could add to a so-called yellow blue response (a linear combination of the cones: Y/B=L+M−2S). Alternatively, the difference could be computed by some (linear combination) of the difference between dichromat and normal cone responses.

Figure 4A:
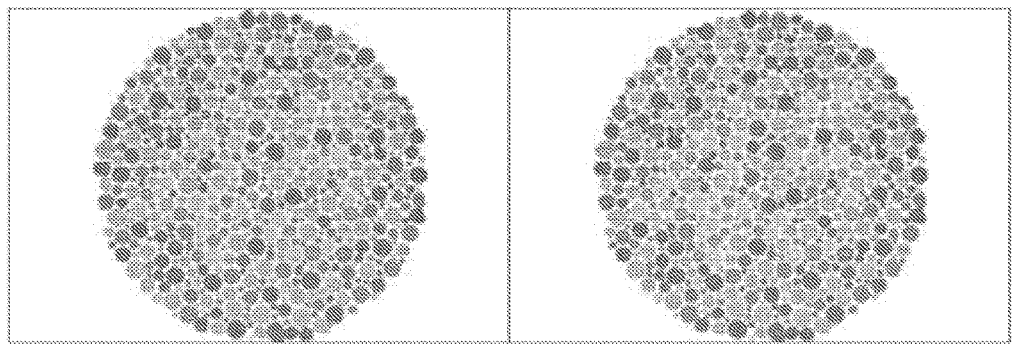
FIG. 4A, left, shows a daltonized image and, right, the visualisation of what the colour-blind observer sees.
Figure 4B:
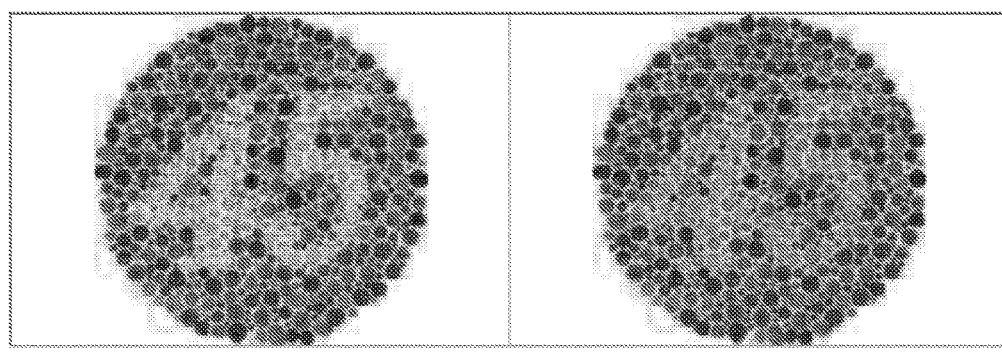
FIG. 4B is a black and white version of FIG. 4A deliberately manipulated to highlight colour differences when printed or displayed in black and white.

In FIG. 4A, left, a daltonized image is shown and, right, the visualisation using an embodiment of the present invention shows what the red-green colour-blind observer sees. Notice the 45 'pops out' and this again mirrors the experience of colour-blind observers. They can see what they could not see before. Notice however that the colour of the 45 has changed (pink as opposed to orange). So, we have made the image accessible but degraded the colour fidelity for colour-normal.

Visualising What a Colour-Normal Person Sees (from a Colour Anomalous Perspective)

Equation (12) provides a prescription for making an image which when seen by a colour-normal is a visualisation of what a colour-blind observer sees. In [2] by inverting this idea it is proposed that we can make an image which when seen by a colour anomalous observer is a visualisation—from the anamolous observer's perspective—of what a colour-normal sees. It allows a colour anomalous observer to, in some sense, see like colour-normal do:

$$\underline{\alpha}=[M^+]^{-1}M\underline{\alpha} \tag{16}$$

In (16) we solve for the cone response and then find the RGB (the combination of the display outputs) that induce the same response in the anomalous observer. Note that, since there is the inversion of the anomalous colour matching matrix, this visualisation can only be used for anomalous and not pure dichromats.

Solving for the Best Image for Two Observers (Colour-Normal and Colour-Deficient)

For a given image I we can, according to colorimetry, calculate the cone responses $\underline{P}^{i,j}$. We also understand how RGBs map to anomalous responses $\underline{p}=M^+\underline{\alpha}$. However, we would like to find an image—using embodiments of the present invention such—that the predicted anomalous response is similar to the predicted cone response. Thus, we solve for the RGB image which simultaneously—so far it is possible—induces the same cone and anomalous responses. In the first embodiment we minimize:

$$\min_{\underline{\alpha}^{i,j}} \|\underline{P}^{i,j} - M^{-1}\underline{\alpha}^{i,j}\| + \|\underline{P}^{i,j} - [M^+]^{-1}\underline{\alpha}^{i,j}\| \tag{17}$$

i.e., find the single RGB which when mapped to cone and anomalous responses is simultaneously closest to $\underline{P}^{i,j}$ (the starting cone response). Here $\|\cdot\|$ might denote the sum of squares or other norm (e.g., Minkowski norms). In the case of simple least-squares, the closed-form solution to (17) is a 3×3 matrix: $(N^tN+[N^+]^tN^+])^{-1}[N+N^+]^t \underline{P}^{i,j}$ (where $N=M^{-1}$ and $N^+=[M^+]^{-1}$). For other norms, the pixel values can be found using a search based method such as set out in reference [3], the contents of which are herein incorporated by reference.

Plausibly we might map the cone and anomalous responses according to vector functions f( ) and g( ) to model colour differences, as it is generally accepted that Euclidean distance in cone space does not correlate well to perceived difference.

$$\min_{\underline{\alpha}^{i,j}} \|f(\underline{P}^{i,j}) - g(M^{-1}\underline{\alpha}^{i,j})\| + \|f(\underline{P}^{i,j}) - g([M^+]^{-1}\underline{\alpha}^{i,j})\| \tag{18}$$

For f( ) and g( ) we might use a function like CIE Lab [4] which models colour differences (even though it is not designed to account for colour-blind colour difference assessment).

We can choose to weight the minimization:

$$\min_{\underline{\alpha}^{i,j}} \|f(\underline{P}^{i,j}) - g(M^{-1}\underline{\alpha}^{i,j})\| + \lambda\|f(\underline{P}^{i,j}) - g([M^+]^{-1}\underline{\alpha}^{i,j})\| \tag{19}$$

Where $\lambda$ is a user-defined parameter. As this term becomes larger it is more important to accurately map the image to achieve the desired responses for anomalous observers.

Figure 5A:
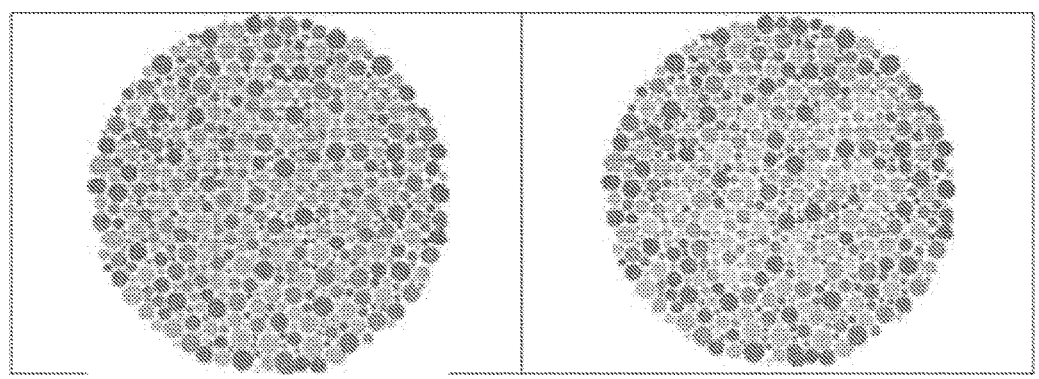
FIG. 5A shows an image recovered by an embodiment of the present invention and a visualisation for deuteranomalous observers.
Figure 5B:
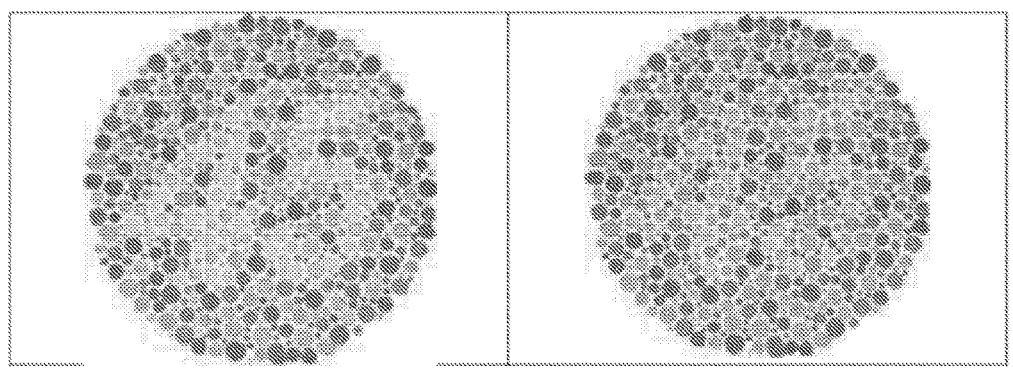
FIG. 5B is a black and white version of FIG. 5A deliberately manipulated to highlight colour differences when printed or displayed in black and white.

In the left of FIG. 5A is shown the image recovered by (19) and a visualisation for deuteranomalous observers (right image). Notice the 45 is visible. Also in the input image the 45 remains closer (has better fidelity) with the original (right panel FIG. 3A).

Solving for the Best Image for Multiple Observers

Clearly, we can find the best image for more than 2 observers, e.g., we could find the best image that simultaneously minimises the error for deuteranopes, protanopes and colour-normal:

$$\min_{\underline{a}^{i,j}} \sum_k \lambda_k \|f(\underline{P}^{i,j}) - g(M_k^{-1}\underline{a}^{i,j})\| \qquad (20)$$

Where $M_k$ is the sensor transform matrix for the kth sensor set.

However, we comment that the best compromise image for multiple observers may—in the colour-blind case—be an image which is pushed toward 'what a colour blind observer might see'.

One solution to this problem would be to optimise not so that the anomalous responses best matches corresponding cone responses but rather that the distances between pairs of response vectors match the distance between the corresponding cone pair.

Cross Optimization

Following from (3), the optimized image for a deuteranope will mainly change the medium-wave output and the optimized protanope image will mainly change the image for the long-wave mechanism. An RGB image J optimized for a deuteranope—e.g., using (17)—but mapped to cone responses will, compared to an original image I (also in cone space) have a different medium-wave response. Analogously, the RGB image K optimized for anomalous protanopes, again mapped to cone coordinates, will have a modified long-wave response compared to the original.

This is an important observation when we consider modifying images for pure colour-blind observers or observers whose colour blindness is more severe. A pure deuteranope is missing the medium-wave sensor. So, even though in optimizing the outputs for anomalous deuteranopes has changed mainly the medium-wave response, these changes are invisible to a pure deuteranope. Similarly, the anomalous protanope image modification is targeted toward the long-wave mechanism yet any modifications here are invisible to the pure protanopes.

Clearly, we wish to modify an image so that it is improved for anomalous and pure deuteranopes alike. From the foregoing reasoning, when we optimise for a deuternope we know the resulting RGB image transformed into cone coordinates will have most of the new variance in the medium-wave mechanism. Since it is this mechanism that is available to the pure protanope, this invention also covers the idea that we find a good fidelity cone image that simultaneously aids colour-blind observers by optimizing the image for anomalous deuteranopes. Similarly, a good general solution for anomalous deuteranopes is the image optimised for protanopes.

So, a key part of our invention is the idea that optimizing RGB images for anomalous deuteranopes produce the appropriate outputs for protanopes (specifically when, as is a common case, we wish to simultaneously make an image accessible to those who suffer from protanopia to different degrees of severity). Conversely, we modify an image for deuteranopia by optimizing for protanopes.

Joint Optimization

Suppose I, J and K are three RGB images. I is the original. J and K are (using (17)) respectively optimized for anomalous deuteranopes and protanopes. We now make a $4^{th}$ image N such that:

$$P_L^N = p_L^K \quad P_M^N = p_M^J \quad P_S^N = P_S^I \qquad (21)$$

That is the new image has the same short-wave cone response as the original. The long-wave response is taken from the anomalous protanope image and the medium-wave response is taken from the anomalous deuteranope image.

Equation (21) is for the special case of modifying images for colour-blind observers a way of finding the best fidelity image for multiple observers (normal, protanopes and deuteranopes).

Improving the Fidelity Post Daltonization

Suppose we have an input image I which is daltonized to give J adjusted so that information is more visible to a colour-blind observer than in image I. For I and J we apply the mapping from RGB to pairs of anomalous responses. In the left hand side of (22) we wish to model the colour difference.

$$\text{difference}([M^+]^{-1}\underline{J}^{i,j}, [M^+]^{-1}\underline{J}^{u,v}) \propto \|[M^+]^{-1}\underline{J}^{i,j} - [M^+]^{-1}\underline{J}^{u,v}\| \qquad (22)$$

The similarity or difference of two anomalous responses is clearly related to the magnitude vector of difference as we show in the right hand side of this function. Assuming $\|\cdot\|$ is the Euclidean distance then we can rotate the vectors and the difference does not change:

$$\|[M^+]^{-1}\underline{J}^{i,j} - [M^+]^{-1}\underline{J}^{u,v}\| = \|R([M^+]^{-1}\underline{J}^{i,j} - [M^+]^{-1}\underline{J}^{u,v})\| \qquad (23)$$

It follows then that we can solve for the rotation matrix R which takes the image J as close as possible—in the anomalous coordinate space—back to the original image I (and in so doing will better preserve the colour fidelity to the original for anomalous and normal observers alike).

$$\min_R \|R[M^+]^{-1}\underline{J}^{i,j} - [M^+]^{-1}\underline{I}^{i,j}\| \qquad (24)$$

The modified image K is written as:

$$\underline{K}^{ij} = M^+ R[M^+]^{-1}\underline{J}^{i,j} \qquad (25)$$

Figure 6A:
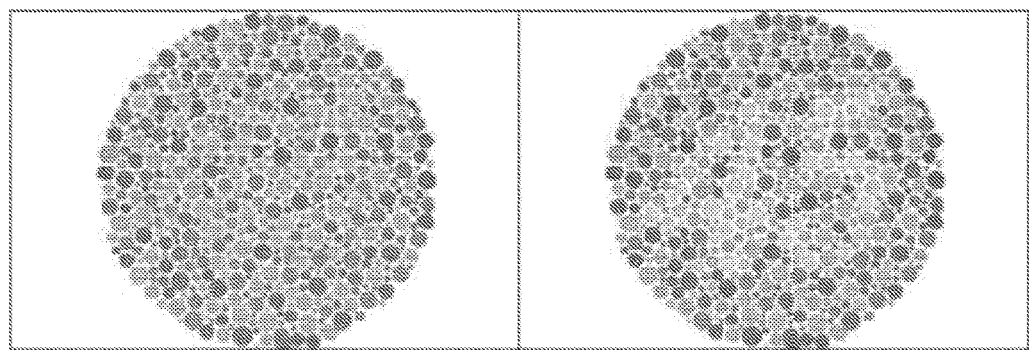
FIG. 6A show a daltonized image (left) and a colour-blind simulation (right)
Figure 6B:
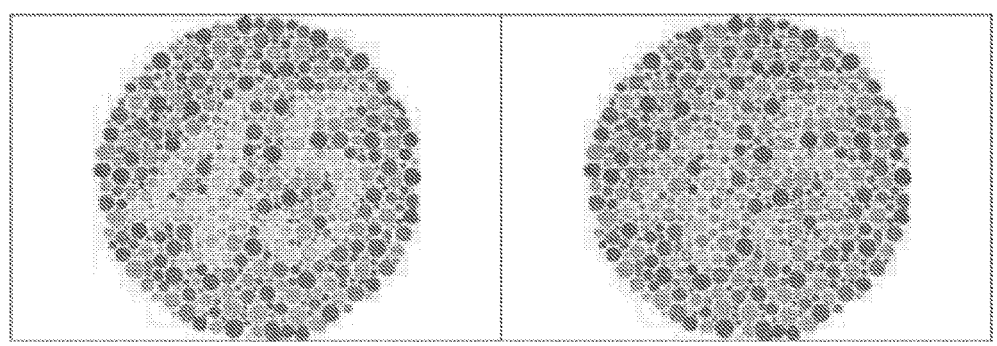
FIG. 6B is a black and white version of FIG. 6A deliberately manipulated to highlight colour differences when printed or displayed in black and white.

In the left image of FIG. 6A, a daltonized image is shown(calculated according to [2]) with the optimal rotation matrix applied. On the right, a colour-blind simulation is shown. Again we see the 45 visible for the deuteranope but the colour fidelity of the original is better preserved (the 45 remains orange).

Additionally we might search for R in some non-linear transform—chosen to model aspects of visual perception such as colour difference—from anomalous responses:

$$\min_R \|Rf([M^+]^{-1}\underline{J}^{i,j}) - f([M^+]^{-1}\underline{I}^{i,j})\| \qquad (26)$$

In which case $$\underline{K}^{ij} = M^+ f^{-1}(Rf([M^+]^{-1}\underline{J}^{i,j})) \qquad (27)$$

Further Optimization

While it is natural to think of R as being a rotation matrix the result holds for any orthonormal matrix: the vector magnitude of the columns are 1 and each pair of columns are orthogonal to one another. Or put another way we might try and map anomalous responses in the daltonized image back to their original counterparts using an arbitrary mapping where there is a penalty added to assure the discovered solution at least approximately preserves Euclidean distance:

$$\min_{H} \|H[M^+]^{-1}\underline{J}^{i,j} - [M^+]^{-1}I^{i,j}\| + \qquad (28)$$

$$\lambda(\|[M^+]^{-1}\underline{J}^{i,j} - [M^+]^{-1}\underline{J}^{u,v}\| - \|H[M^+]^{-1}\underline{J}^{i,j} - H[M^+]^{-1}J^{u,v}\|)^2$$

Here H is an arbitrary 3×3 matrix and A is a user-supplied parameter. The larger the A, the more the constraint that Euclidean distance is preserved is enforced.

Global and Per-Image Optimization

The transform mapping an RGB image I to a counterpart J (so that, for example) information is more accessible to colour-blinds where good colour fidelity is preserved can be computed on a single reference image and then applied to all subsequent images. Equally, our method can be optimized to work on a given per image basis.

In either case the derived transform can always be implemented as a 3 dimensional look up table (with interpolation) and sometimes a simpler transform (such as a 3×3 matrix).

Local Processing

Often large parts of images are visually accessible to colour-blinds. This there is the possibility that we might wish to process images locally. We could for example apply a global processing and determine which parts of the image have changed more than a criterion amount. These areas could be processed separately and, possibly, to a greater degree. The result of the local processing would be blended with the colour original.

Combined Approach

Clearly, we could further optimise the outputs of "Solving for the best image for two observers (colour-normal and colour-deficient)" section, "Solving for the best image for multiple observers and Cross optimization" section using the methods of "Improving the fidelity post daltonization" section. Equally, we could use "Improving the fidelity post daltonization and using daltonization optimized for protanopes and deuteranopes" section as inputs to the multiple observer formalism in the "Cross optimization" section.

Optical Processing

It is possible to simulate in a transmissive filter (which could be included in the lenses of sunglasses, for example). Properties needed for such filters can be found through the optimization methods discussed above.

CONCLUSION

In FIGS. 7A-C an image is processed using methods according to embodiments of the present invention. FIG. 7A is the original (input) image. FIGS. 7B and 7C show two outputs divided horizontally by a line—the left of each image is the original image and the right is the image after processing according to an embodiment of the present invention. Two types of processing were applied. In FIG. 7B, a daltonization algorithm was applied. Advantageously, the output—although it looks different from the original—improves accessibility to deuteranopes. FIG. 7C shows the result of applying (19) to a daltonized image (here we used [2]).

Prior work in the area of transforming images for the colour-blind has two emphases. First, we are interested in visualising how colour-blind observers see. Second, we wish—through daltonization—to make information that is invisible 'pop out' for those suffering from colour blindness. In this second mode the colour fidelity is neither preserved for colour-blind or colour-normal.

In aspects of the present invention we seek to provide a method for helping colour-blind people see better while retaining good colour fidelity for colour-blind and colour-normal alike. Our technology has two preferred embodiments. In one embodiment, a method is disclosed for finding the image which helps colour-blind observers see better while maintaining good colour fidelity for normal colour vision. In another embodiment, methods and systems are applied to improve colour fidelity for images daltonized via any prior art.

Embodiments of the present invention can be applied anywhere visual information is displayed. In TVs, laptops, mobile phones, movies and on the printed page. In addition, the processes are not just limited to human (or even biological) eyes and could also be applied to other sensors such as camera CCDs and the like.

Embodiments of the present invention can be applied to find the best compromise for any set of sensor systems. In one aspect of the present invention, we seek to provide a means for improving the colour fidelity for a range of observers if we know their range of cone response functions (or range of colour matching functions). Equally, as we age, our vision changes. Indeed we begin to suffer a sort of colour blindness where we start to confuse colours which, in our youth, were previously easy to tell apart.

FIG. 8 is a schematic diagram of an embodiment of the present invention.

Sensor responses for an input image 10 are estimated, for example by relating known cone responses for a known colour reference to those measured by an imaging device. The sensor responses estimated include sensor responses for cone sensors including a first cone sensor set 20a and a second, different, cone sensor set 20b. The sensor sets may be of human or animal eyes of and normal or anomalous vision types. The sensor responses are processed by a system 30 such as a computer executing computer program code in a processor to determine a transform mapping 40.

The transform mapping, when applied to a source image 50 enables generation of a modified image 60. The transform mapping may be implemented in many ways including in filters, as part of driver software or hardware for a computing device or other display device such as a television or as part of a printer driver that modifies colour images as they are printed.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The contents of the abstract filed herewith and the applications GB 1312196.7, GB 1312310.4 and GB 1401599.4 from which this application claims priority are herein incorporated by reference in their entirety.

REFERENCES

[1] F. Vienot, H. Brettel, L. Ott, A. B. M'Barek and J. D. Mollon (1995) What do colour-blind people see? *Nature* 376, 127-128
[2] Seungji Yang; Yong-Man Ro, "Visual contents adaptation for color vision deficiency," *Image Processing, 2003. ICIP 2003. Proceedings. 2003 International Conference on*, vol. 1, no., pp. I, 453-6 vol. 1, 14-17 Sep. 2003
[3] Nelder, John A.; R. Mead (1965). "*A simplex* method for function minimization". *Computer Journal* 7: 308-313
[4] G. Wyszecki and W. S. Stiles, Color science: Concepts and methods, quantitative data and formulae, New York: Wiley, 1982 (2nd ed.)

The invention claimed is:

1. A computer-implemented image processing method comprising:
  executing by a processor, computer program code to estimate sensor responses of a human visual system for an input image, the sensor responses including sensor responses for cone sensors for a first human observer or observer type including a first cone sensor set and a second, different, cone sensor set for a second human observer or observer type;
  executing, by the processor, computer program code to determine, in dependence on the sensor responses, a transform mapping for application to a source image that is a daltonized image, in which determining the transform mapping includes determining a rotation matrix R that when applied to the source image takes the source image in anomalous coordinate space substantially back to the input image whereby the rotation preserves color fidelity to the original image for anomalous and normal observers;
  receiving the source image;
  generating, by the processor, a modified image by applying the transform mapping to the source image, wherein the modified image has optimized color fidelity for the first and second sensor sets; and
  providing the modified image for presentation on a display to the first and second human observers or observer types so that both can perceive the optimized color fidelity.

2. The method of claim 1, wherein the cone sensors include a normal cone sensor set and an anomalous cone sensor set.

3. The method as claimed in claim 1, wherein the computer program code to determine includes computer program code to determine a transform mapping arranged to generate a modified image that is optimized to induce similar normal cone sensor and anomalous cone sensor responses when viewed.

4. The method of claim 1, wherein the computer program code to estimate includes computer program code to relate known cone responses for a known color reference to those measured by an imaging device.

5. The method of claim 1, wherein the source image is different to the input image.

6. The method of claim 1, including the step of executing, by a processor, computer program code to map anomalous responses in the source image back to their original counterparts using a mapping that includes a penalty term, the penalty term at least approximately preserving Euclidean distance.

7. The method of claim 1, wherein the computer program code to determine includes computer program code to determine a transform that optimizes the source image whereby the cone responses of at least one of the cone sensor sets in response to viewing the modified image are similar to the cone response of another of the cone sensor sets in response to viewing of the source image.

8. The method of claim 7, wherein the computer program code to determine includes computer program code to determine a transform that optimizes the source image by minimizing a difference in the cone responses of one of the cone sensor sets in response to viewing the source and modified images.

9. The method of claim 1, wherein the computer program code to determine includes computer program code to determine a transform that minimizes a calculated difference in cone response to the modified image by the first and second cone sensor sets, the first cone sensor set being a normal cone sensor set and the second cone sensor set being an anomalous cone sensor set.

10. The method of claim 9, wherein the computer program code to determine includes computer program code to apply a weighting factor to bias the minimization.

11. The method of claim 1, wherein computer program code to determine is based on a normal cone set and a first and second related anomalous cone sensor set wherein the transform optimized for the first anomalous set minimizes a calculated difference in cone response to the modified image for the second cone sensor set.

12. The method of claim 1, further comprising executing, by a processor, computer program code to encode the transform mapping in a computer program executable to transform a source image to generate the modified image, wherein the computer program comprises a display driver for applying the transform mapping to input data and providing the modified image for display on a display.

13. The method of claim 1, further comprising including the transform mapping in a device to modify a received source image to generate the modified image as an output of the device, wherein the device is selected from a set including a printer, a television, a computing device, a smartphone, a digital camera or a transmissive filter.

14. The method of claim 1, wherein the computer program code to determine the transform mapping includes computer program code to determine the transform mapping by regression.

15. The method of claim 1, wherein the converse of a deuteranope type is a protanope type and the converse of a protanope type is a deuteranope type, the computer-implemented method further comprising, upon one of the cone sensors being of a deuteranope or protanope type, computer program code to determine a transform mapping comprising that generates a modified image that has optimized color fidelity for the converse type.

16. The method of claim 1, wherein the computer program code to determine a transform mapping comprising computer program code to determine a transform mapping that generates a modified image from a source image having a short-wave response as the source image, a long-wave response optimized for anomalous protanopes and a medium wave response optimized for anomalous deuteranopes.

17. The method of claim 1, wherein the step of executing, by the processor, computer program code to apply the transform mapping is performed by a device that is selected from a set including a printer, a television, a computing device, a smartphone, a digital camera or a transmissive filter.

18. The method of claim 1, wherein the computer program code includes computer program code associated with a display driver, and wherein the displaying step comprises receiving, by the display driver, the modified image, and executing, by the processor, the computer program code associated with the display driver to output the modified image on the display.

19. The method of claim 1, wherein providing the modified image for presentation on a display includes displaying the modified image on a display.

* * * * *